Feb. 3, 1970 S. MARIASH 3,493,054
FIELD MARKER ACTUATING DEVICE
Filed May 4, 1967 2 Sheets-Sheet 1

INVENTOR
STEPHEN MARIASH
HIS ATT'YS

United States Patent Office 3,493,054
Patented Feb. 3, 1970

3,493,054
FIELD MARKER ACTUATING DEVICE
Stephen Mariash, Box 84, Sylvania,
Saskatchewan, Canada
Filed May 4, 1967, Ser. No. 636,128
Claims priority, application Canada, May 14, 1966,
960,387
Int. Cl. A01b *69/02, 65/00;* A01c *5/00*
U.S. Cl. 172—130
6 Claims

ABSTRACT OF THE DISCLOSURE

A quadrant with a pair of levers connected to a pair of field markers so that both markers are lowered when the levers are at one end of the quadrant and both are raised when the levers are at the other end. The quadrant also contains lever moving means connected to a fluid operator which raises and lowers soil working tools of the implement. An escapement assembly on the quadrant holds one lever with its marker raised and releases the other lever so that its marker is lowered, when the levers are alternately moved toward the escapement assembly by the lever moving means during successive actuations of the fluid operator.

---

Figure 1:
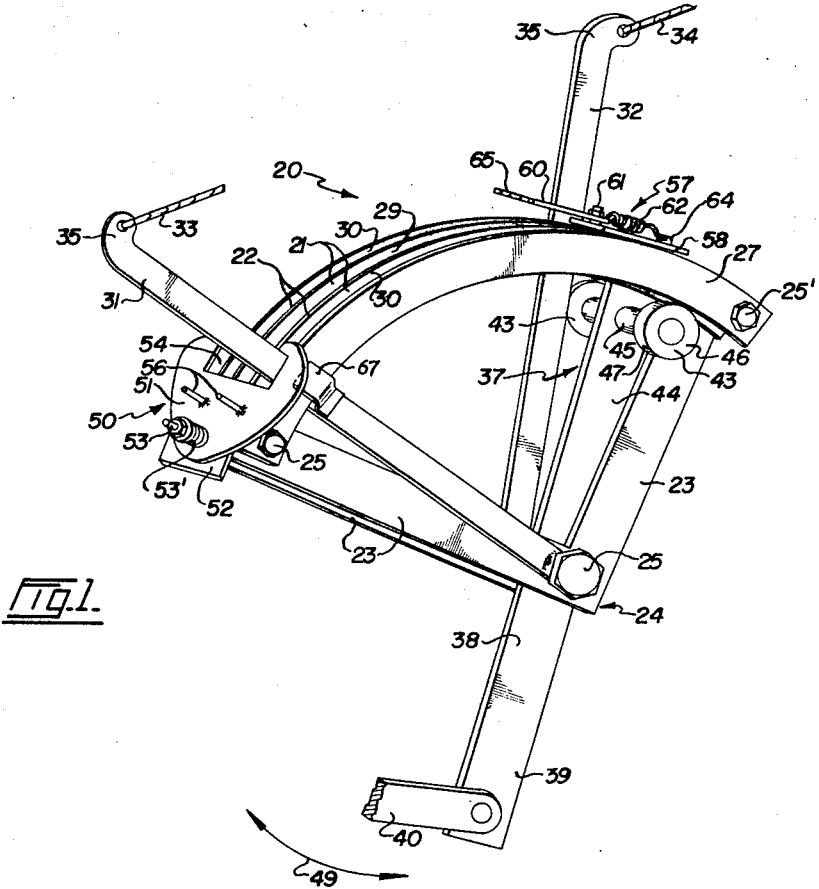

During seeding operations or during the use of relatively wide tillage equipment, it is usual to provide a field marker on each end of the equipment which extends outwardly therefrom and marks a light furrow in the soil thus providing a guide for the operator when next he travels down the field with the equipment.

It is normal to raise both of the markers when turns are being made and to lower one of the markers when the next path is made. When a turn is made at the further end of the field, both markers are raised and the other marker is lowered.

The raising and lowering of the field markers is accomplished manually by the operator hauling on ropes or cables secured adjacent to the rear of the tractor and this is arduous and awkward, particularly as it is necessary to raise both markers when turns are being made.

Inasmuch as it is also usual to raise the disc gangs, furrow openers and the like when turns are being made, and inasmuch as this raising and lowering is normally accomplished hydraulically, I have provided a device actuated by the mechanism for raising and lowering the disc gangs and the like which automatically raises the ground engaging field marker, and then when the turn is completed, lowers the other field marker as the disc gangs or the like are lowered.

This is accomplished by providing a novel escapement means in the quadrant mounting the levers connected to the field markers so that as one lever is moved towards the other end of the quadrant, thus raising the ground engaging field marker, the escapement plate pivots, engaging the first mentioned lever and releasing the second mentioned lever which in turn is connected to the other field marker thus permitting other said field marker to become engaged with the ground.

The principal object and essence of the invention is therefore to provide a device of the character herewithin described in which the field markers are automatically raised and lowered alternately as the disc gangs or the like are raised and lowered.

Another object of the invention is to provide a device of the character herewithin described in which both field markers can be moved through the upper position while turns are being made.

A still further object of the invention is to provide a device of the character herewithin described in which the device can be actuated either directly from linkage connecting to the hydraulic piston and cylinder assembly or, alternatively, to the depth control gang shaft on power lift models.

A still further object of the invention is to provide a device of the character herewithin described which can be attached to existing equipment readily and easily.

A yet further object of the invention is to provide a device of the character herewithin described which is simple in construction, economical in manufacture, and otherwise well suited to the purpose for which it is designed.

Figure 2:
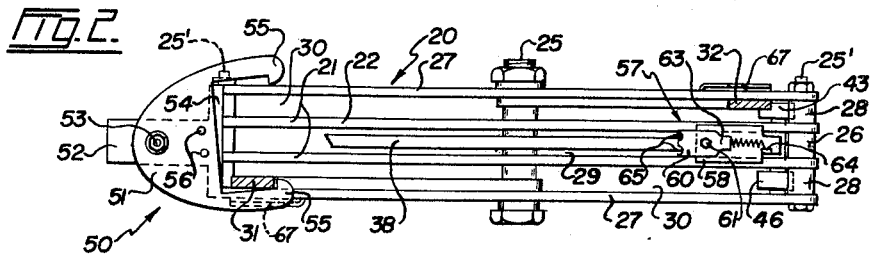
Figure 3:
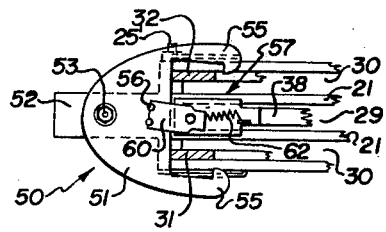
Figure 4:
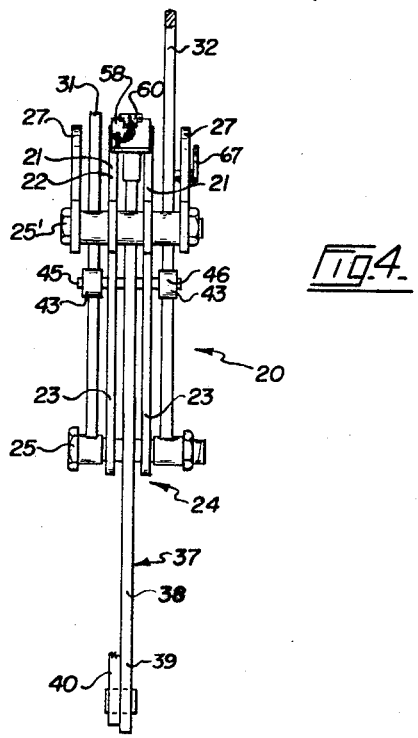
Figure 5:
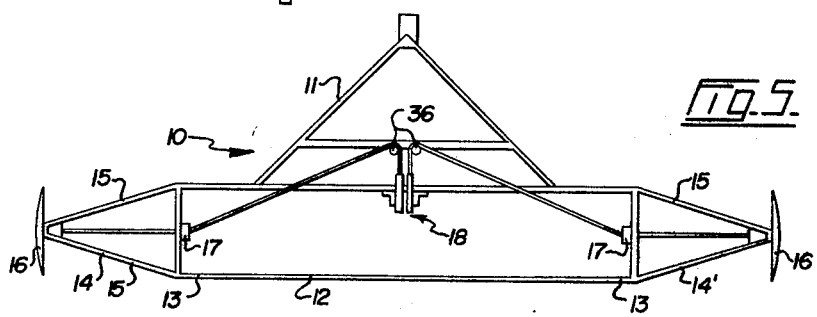
Figure 6:
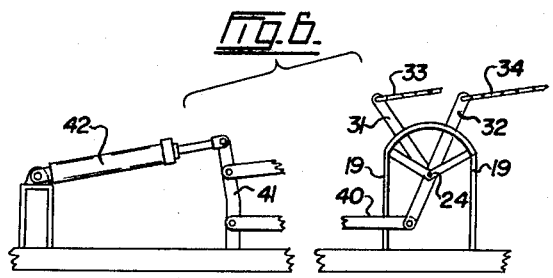

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is an isometric view of the device per se.
FIGURE 2 is a top plan view of FIGURE 1.
FIGURE 3 is a fragmentary top plan view similar to FIGURE 2, but showing the escapement operation.
FIGURE 4 is a fragmentary rear view of FIGURE 1.
FIGURE 5 is a schematic view of a tillage device showing schematically the field markers and cables attached thereto.
FIGURE 6 is a fragmentary schematic view showing one method of attachment of the device to the hydraulic actuating linkage.

In the drawings like characters of reference indicate corresponding parts in the different figures.

Proceeding therefore to describe my invention in detail, reference should first be made to FIGURE 5 in which 10 illustrates generally and in schematic form only tillage equipment in the form of a press drill, wide cultivator or the like.

Tilling means 11 extends forwardly from the transversely extending frame 12 and is normally attached to a tractor (not illustrated) including a source of hydraulic power thereon.

Extending from each end 13 of the transverse frame 12 is a field marker assembly 14 and 14'. Each of these field marker assemblies includes the diagonal members 15 pivoted by the ends thereof to the ends 13 of the frame 12 and adapted to be moved upwardly and downwardly with relation to the frame. Ground engaging discs 16 are mounted for rotation upon the ends of the diagonals 15 and form the field marking furrow in the ground and to one side of the machine.

Upwardly extending supports 17 are provided upon the ends 13 of the frame 12 and these supports carry sheaves (not illustrated) over which the actuating cables of the field markers normally run.

Guides collectively designated 18 may be mounted in any convenient position upon the frame 12 by means of brackets 19 which are shown as typical only.

The device is shown in detail in the remainder of the drawings and comprises a quadrant assembly 20.

This assembly includes a pair of spaced and parallel quadrant plates 21 having arcuately curved upper portions 22 and diagonal portions 23 which converge towards the apex 24 of the quadrant assembly.

A main pivot bolt 25 passes through the apices 24 and spacers (not illustrated) maintain the apices in the desired spaced relationship.

Further bolt assemblies 25' extend through the ends of the arcuate portions 22, spacers 26 maintaining the desired spaced relationship, and further arcuate strips 27 are mounted on these bolts 25' upon each side of the members 20, spacers 28 maintaining these further arcuate members 27 in spaced and parallel relationship with the arcuate members 22.

The four arcuate members 22 and 27 thus define a central channel 29 and a pair of side channels 30.

A first lever 31 is mounted by the lower end thereof for pivotal movement to the pivot bolt 25 and this lever is movable within the quadrant and within the channel 30 formed by the arcuate members as hereinbefore described.

A second lever 32 is also mounted on bolt 25 by one end thereof and is adapted to move in the other channel 30 upon the opposite side of the quadrant assembly.

Cables 33 and 34 are secured by the ends thereof to the upper ends 35 of the levers 31 and 32 and extend around sheaves 36 (see FIGURE 5). Cable 33 goes to the sheave in one of the vertical posts 17 and thence to adjacent the disc 16 of the field marker assembly 14.

The other cable 34 also extends to the corresponding sheave in the vertical post 17 and thence to adjacent the disc 16 of the other field marker assembly 14' so that it will be appreciated that movement of the levers 31 and 32 within the quadrant assembly 18 will cause the field marker 14 and 14' to be raised and lowered.

Lever moving means collectively designated 37 comprises a member 38 pivoted intermediate the ends thereof upon bolt 25 and being located centrally between the two quadrants 20, the upper end of this member running within the channel 29 and between the levers 31 and 32.

The lowermost end 39 of this member is connected by linkage 40 (see FIGURE 6) to a link or member 41 actuated by a hydraulic cylinder and piston assembly 42 which is adapted to raise and lower the disc gangs or furrow openers. This is shown schematically in FIGURE 6 and it will be appreciated that this linkage 40 can connect to any member operated by the hydraulic cylinder and piston assembly 42.

Lever edge engaging means 43 extend upon each side of the upper end 44 of the member 38 and take the form of shafts 45 having cylindrical members 46 upon each end thereof. The upper portions of these cylindrical ends 46 run within the underside of channels 30 and the perimeters 47 engage the edges 48 of the levers 31 and 32, it being understood that member 38 is moved in an arc indicated by the double-headed arrow 49 (see FIGURE 1). It will therefore be appreciated that movement of the lower end 39 of member 38 rightwardly with respect to FIGURE 1, will cause the upper end 44 to move leftwardly and to engage the levers 31 and 32 moving these levers also within their channels 30.

During operation of the device, it is of course obvious that it is only necessary to have one of the field markers in ground engaging position, the other one being raised.

In FIGURE 1, lever 32 which is connected by cable 34 to the field marker assembly 14', is in the ground engaging position whereas lever 31 connected via cable 33 to the field marker assembly 14, is in the raised position.

Therefore, when the member 38 is moved as hereinbefore described, corresponding to the raising of the gangs or furrow openers at a corner, lever 32 is moved leftwardly towards lever 31 so that at this particular point, both field marker assemblies 14 and 14' are clear of the ground.

However, it is then necessary to release lever 31 and retain lever 32 in the raised position and I have therefore provided an escapement assembly collectively designated 50.

This escapement assembly consists of a plate 51 pivotally mounted upon an extension 52 formed on one end of the quadrant assembly 20. I have provided a bolt 53 for this pivotal mounting carrying a spring 53' which permits adjustment of the frictional bearing between the underside of the plate and the extension 52.

This plate is provided with an open front portion 54 having a pair of hooks 55 formed upon each side of the opening and adapted to engage one or other of the levers 31 and 32 depending upon the pivoting of the plate 51.

In FIGURE 2, the plate is shown pivoted to the left thus engaging lever 31 and in FIGURE 3, it is shown pivoted to the right thus engaging lever 32, it being clearly understood that both levers cannot be engaged at the same time.

A pair of pins 56 extend upwardly from the plate 51 one each side of the centre line thereof and these pins are utilized to pivot the plate to one side or the other as will hereinafter be described.

An escapement plate actuator 57 is provided upon the upper member of end 38 and comprises a support 58 which engages the upper edges 59 of the arcuate plates or members 22 and a plate 60 is pivoted upon this member 58 by means of pivot bolt 61.

This plate is pivoted intermediate the ends thereof and is maintained centrally by means of a tension spring 62 extending between the rear end 63 of the plate and a lug 64 formed on the rear of member 58. This spring normally maintains the plate 60 parallel to the direction of travel of the levers 31 and 32.

A pair of notches 65 are formed upon the front end 66 of this plate and are adapted to engage one or other of the pins 56 depending upon the position of the escapement plate 51 when plate 60 approaches same.

In operation, reference should be made to FIGURES 2 and 3. The lever 31 is engaged by the hook 55 thus maintaining the field marker 14' in the raised position. The other lever 32, is in the released position so that the weight of the field marker 14 causes this field marker to be in the ground engaging position.

When the gangs are raised, for cornering, the member 39 is actuated by the linkage 40 thus moving lever 32 leftwardly with respect to FIGURE 1. At the same time, the escapement actuating plate 60 is moving towards the escapement assembly 50 as it is attached to the upper end of member 38.

As it approaches the escapement plate, which is in the position in FIGURE 2, one of the notches 65 engages the pin 56 which is closest thereto. At this time, lever 32 is in the position shown in FIGURE 3 and until the escapement plate 51 is actuated, both field markers are in the raised position thus enabling the machine to be turned.

Further slight movement of the actuator plate 60 in the direction of the escapement plate 51 causes the escapement plate to be moved over to the position shown in FIGURE 3, the actuating plate rocking upon its pivot as shown. This releases lever 31 and the weight of the field marker assembly 14' causes same to engage the ground thus moving lever 31 to the opposite end of the quadrant.

Lever 32 being held by the hook 55 on the left-hand side of FIGURE 3, prevents the field marker 14 from engaging the ground until the opposite sequence takes place.

This escapement mechanism permits the sequential lowering and raising of the field markers as turns are made which is normally desirable.

However, the sequence can be changed by manipulating the hydraulic assembly so that the escapement mechanism passes through one sequence to the other.

The raising and lowering of the field markers is therefore automatically controlled by the raising and lowering of the disc gangs or furrow openers by means of conventional hydraulic mechanism, and it will be seen that it is not possible for both field markers to engage the ground at the same time yet it is possible that they both be maintained at the raised position during cornering operation whereupon the opposite marker engages the ground.

Finally, it will be appreciated that the movement of levers 31 and 32 within channels 30 should be accurate otherwise the escapement mechanism may not operate satisfactorily.

These levers can of course be machined to operate within the channels 30 without any side play, but alternatively I desire to provide lugs 67 secured to the outer sides of levers 31 and 32 and engaging the outer sides of the arcuate members 27 as shown in FIGURES 1 and 2 thus eliminating any undesirable side play of the levers.

What is claimed to be the present invention is:

1. In a farm implement such as a press drill, gang cultivator or the like, which includes a transversely elongated frame, soil working tools connected to said frame for raising and lowering movement, a fluid operator for actuating said tools, a pair of field markers pivoted to the respective opposite ends of said frame, and an automatic field marker actuating device for alternately raising each field marker and lowering the other in response to successive actuations of said tools by said fluid operator, said device comprising in combination a quadrant mounted on said frame, first and second levers pivoted on a common fulcrum and movable in spaced parallel planes in said quadrant from one end of the quadrant to the other, cables connecting said levers to the respective field markers so that both markers are lowered when the levers are at one end of the quadrant and so that both markers are raised when the levers are at the other end of the quadrant, lever moving means also mounted on said common fulcrum for movement in said quadrant in a plane parallel to said first and second levers, linkage operatively connecting said lever moving means to said fluid operator, and an escapement assembly provided at said other end of the quadrant for holding one of said levers and releasing the other lever when said escapement assembly is engaged by said lever moving means.

2. The device according to claim 1 wherein said lever moving means comprises a member movable about said common fulcrum in a plane between said first and second levers, and lever edge engaging means extending from each side of said member.

3. The device according to claim 1 in which said escapement assembly includes an escapement plate pivotally mounted on said other end of said quadrant and being alternately engageable with said first and second levers when said plate is engaged by said lever moving means, said lever moving means having an escapement plate actuator secured to its upper end for engaging said escapement plate.

4. The device according to claim 3 in which said escapement plate is provided with a lever engaging hook formed on each side thereof and a pair of escapement plate actuator pins extending upwardly therefrom.

5. The device according to claim 4 in which said escapement plate actuator comprises a plate pivoted to the upper end of said lever moving means member and moving between said first and second levers, notches formed on the leading edge of said plate alternately engageable with each of said pins.

6. The device according to claim 5 in which said plate includes spring means normally urging said plate into parallel relationship with the direction of travel of said levers.

References Cited

UNITED STATES PATENTS 2,975,841   3/1961   Oehler et al. _____ 172—128

FOREIGN PATENTS 628,612   2/1963   Belgium.
710,810   6/1954   Great Britain.

ROBERT E. BAGWILL, Primary Examiner

ALAN E. KOPECKI, Assistant Examiner

U.S. Cl. X.R.

111—25